United States Patent
Epp et al.

[11] Patent Number: 6,003,453
[45] Date of Patent: Dec. 21, 1999

[54] FLANGED SEEDING DRUM

[76] Inventors: Richard J. Epp; Dwayne S. Epp, both of Box 64, Fiske, Canada, S0L 1C0

[21] Appl. No.: 08/794,664

[22] Filed: Feb. 3, 1997

[51] Int. Cl.[6] .................................................. A01B 49/06
[52] U.S. Cl. .............................................................. 111/157
[58] Field of Search ..................................... 111/157, 148

[56] References Cited

U.S. PATENT DOCUMENTS

| | | | |
|---|---|---|---|
| 1,637,424 | 8/1927 | Morrow | 111/157 X |
| 3,219,000 | 11/1965 | Leach et al. | 111/157 X |
| 4,088,083 | 5/1978 | Dail, Jr. et al. | 111/148 X |
| 4,324,295 | 4/1982 | Weichel | 111/148 X |
| 4,492,172 | 1/1985 | Gramckow | 111/157 X |
| 5,666,892 | 9/1997 | Tortella et al. | 111/157 X |

FOREIGN PATENT DOCUMENTS 1217273   3/1986   U.S.S.R. ................................. 111/157

*Primary Examiner*—Christopher J. Novosad
*Attorney, Agent, or Firm*—Adrian D. Battison; Murray E. Thrift

[57] ABSTRACT

An apparatus for sowing seeds in a plurality of identical furrows is described. The seed sowing apparatus comprises a scraper, seed tubes, a packer and a cylindrical drum with a plurality of ground engaging flanges attached around its periphery. All of the components of the seed sowing apparatus are mounted in a frame arranged for ground transportation. In operation, the cylindrical drum rolls over the ground so that the flanges engage the ground and then release, thereby generating furrows. The seed tubes deposit seeds into the furrows before the scraper directs soil into the furrows, thereby enclosing the seeds. Lastly, the packer compresses the soil enclosing the seeds, thereby promoting synchronous germination of the crop.

11 Claims, 3 Drawing Sheets

FLANGED SEEDING DRUM

The present invention relates to a seeding apparatus. More specifically, the present invention relates to a seeder designed to roll directly on the ground of a field being sown.

BACKGROUND OF THE INVENTION

There are no examples in the prior art of devices for sowing seeds in uniform furrows designed to remain in constant contact with the ground. Such a device would be better able to overcome changes in the topography of the field being sown, thereby ensuring that all of the furrows formed are of uniform depth. Uniform seed depth is a determining factor in synchronous crop germination. As an example, a device designed to form furrows while rolling directly on the ground would accomplish sow seeds at a constant depth. Additionally, a rolling seeder could also be used as a land-roller, pushing stones and other obstacles in the field underground, thereby preventing them from damaging other equipment.

SUMMARY OF THE INVENTION

It is one object of the present invention, therefore, to provide a seed sowing apparatus that rolls directly on the ground, forming furrows of uniform depth in the process.

According to a first aspect of the invention, there is provided a seed sowing apparatus comprising:

a frame arranged for transportation across the ground, said frame having an intended direction of working movement;

a cylindrical drum having a peripheral wall for rolling on the ground;

means for mounting the cylindrical drum in the frame for rotation about a longitudinal axis of the drum;

at least one annular flange mounted on the drum so as to tend radially outwardly and lying in a radial plane of the drum, extending partly around the cylindrical drum, said flange for engaging and displacing oil, thereby forming furrows; and a plurality of seed tubes connected to the frame at positions that are behind the cylindrical drum relative to the intended direction of working movement of the frame, said seed tubes for depositing seeds into the furrows, wherein the frame holds the cylindrical drum so that the axis of the cylindrical drum is not at right angles relative to the intended direction of working movement of the frame. The cylindrical drum must be at an angle in order for the furrows to be formed. Additionally, the depth of the furrow formed is directly proportional to the height of the flange.

Preferably, the seed sowing apparatus includes means for directing the soil into the furrows, thereby enclosing the seeds within the soil. The means for directing the soil into the furrows may comprise a spring-loaded horizontal scraper connected to the frame at a position that is behind the seed tubes relative to the intended direction of working movement of the frame.

The seed sowing apparatus may include a packer that is attached to the frame at a position that is behind the horizontal scraper relative to the intended direction of working movement of the frame. The packer may comprise a plurality of V-shaped rings positioned such that they will pass between the furrows formed by the flanges. The packer compresses the soil enclosing the seeds, which is necessary for synchronous germination of the seeds.

Preferably, the cylindrical drum is hollow and includes an aperture for the addition of water. Adding water will increase the weight of the cylindrical drum, making it possible to use the seed sowing apparatus as a land roller.

The flanges may be bolted to the cylindrical drum.

Preferably, the angle of the axis of the cylindrical drum relative to the intended direction of working movement of the frame is adjustable. By adjusting the angle of the axis, the width of the furrow can be varied. Preferably, the angle of the axis is variable from 30° to 70°.

DETAILED DESCRIPTION

Figure 1:
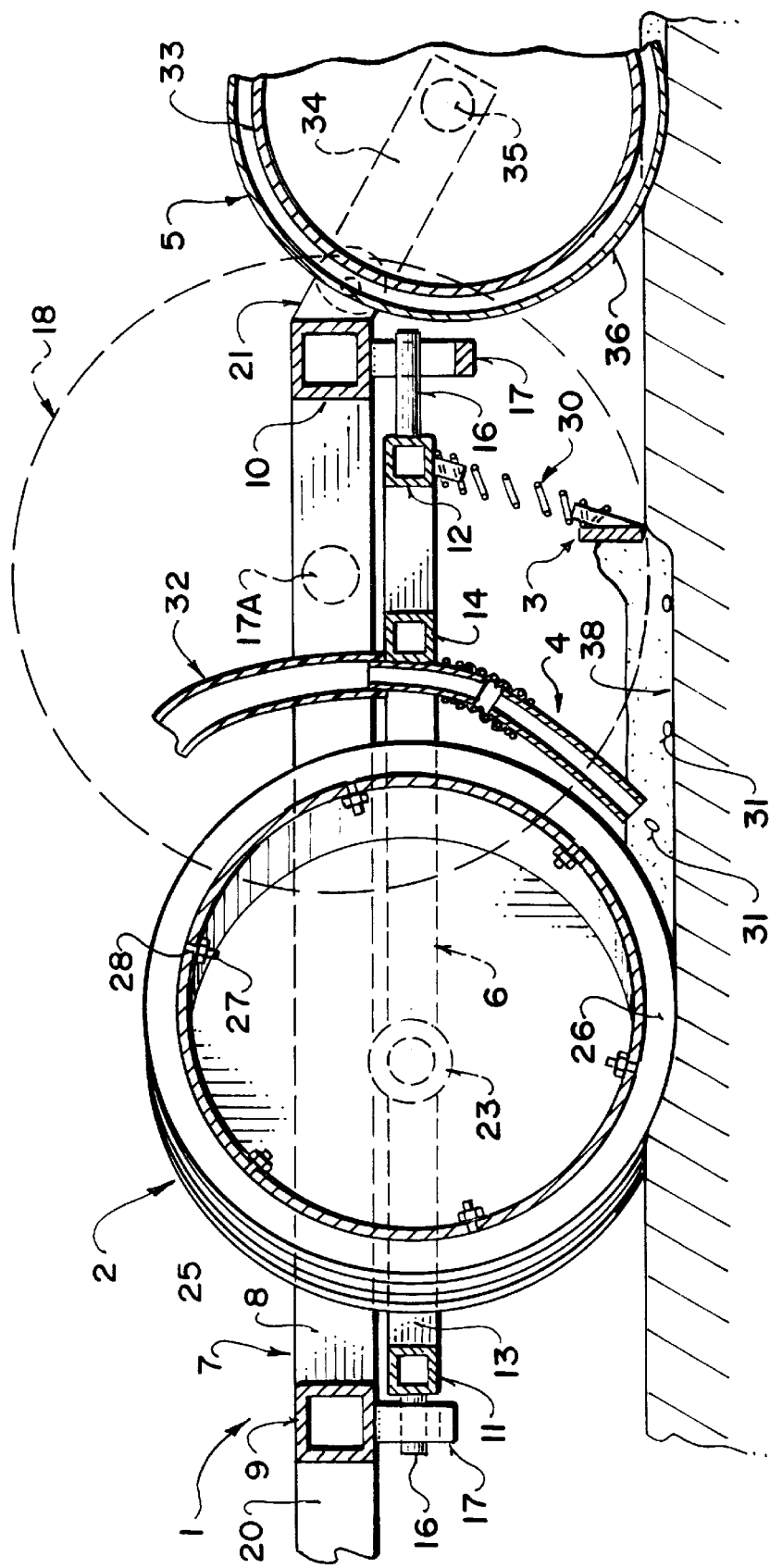
FIG. 1 is a side elevational view of the seed sowing apparatus.
Figure 2:
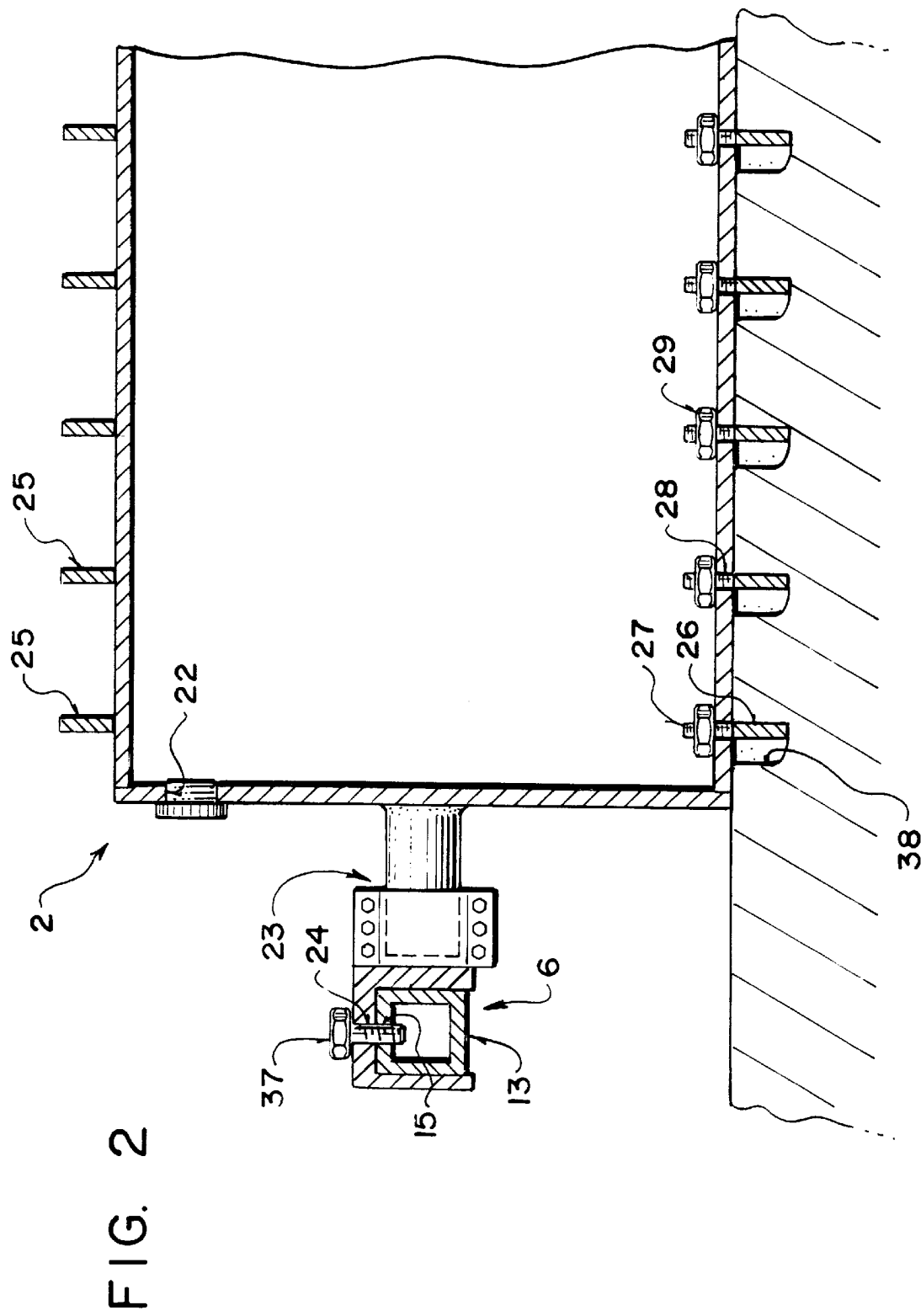
FIG. 2 is a cross-sectional view of the seed sowing apparatus in operation.
Figure 3:
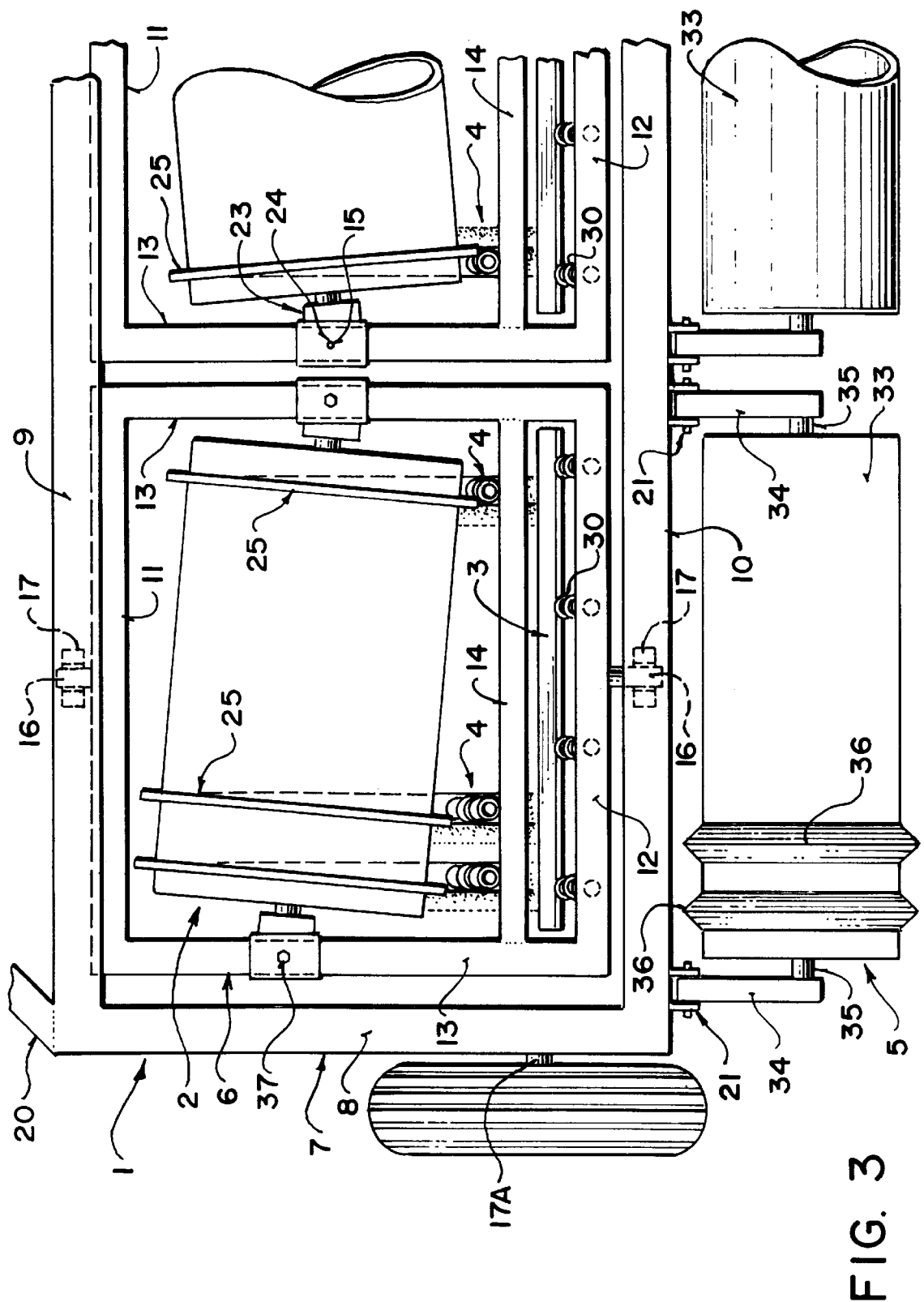
FIG. 3 is a top plan view of the seed sowing apparatus.

In one embodiment, the seed sowing apparatus, shown in FIGS. 1–3, comprises a frame 1, a drum 2, a scraper 3, seed tubes 4 and a packer 5.

The frame 1 is arranged for transport across the ground and has an intended direction of working movement. The frame 1 has substantially horizontal character and comprises an inner frame 6 and an outer frame 7. The outer frame 7 comprises two lateral members 8, a front member 9 and a rear member 10. The inner frame 6 comprises a head member 11, a tail member 12, two side members 13 and a bar 14. The bar 14 is connected to both side members 13 such that it is parallel to the tail member 12 and is located proximal to the tail member 12. The bar 14 is involved in the attachment of the seed tubes 4 to the seed sowing apparatus as described below. There are apertures 15 in the two side members 13 for mounting the drum 2 in the frame 1 as described below. The tail member 12 of the inner frame 6 is involved in the attachment of the scraper 3 to the seed sowing apparatus as described below. The inner frame 6 is mounted into the outer frame 7 so that the inner frame 6 can twist and rotate freely. The exact means by which this is accomplished is unimportant and will be obvious to one skilled in the art. In one embodiment, two cylindrical shafts 16 extend outward from the inner frame 6, connected to the head member 11 and the tail member 12 respectively. These cylindrical shafts 16 are fitted into "U"-shaped slots 17 located in the front member 9 and the rear member 10 of the outer frame 7. The cylindrical nature of the shafts 16 allows the inner frame to twist while the "U"-shape of the slots 17 allows the inner frame 6 to move up and down freely relative to the outer frame 7. The end result is that in operation the drum 2 of the seed sowing apparatus is better able to follow the lay of the land. An axle 17A connected to a wheel 18 is attached to each of the lateral members 8 of the outer frame 7 to facilitate transport of the seed sowing apparatus over the ground. There are hitch members 20 that extend outward from the points on the outer frame 7 where the lateral members 8 are connected to the front member 9 for connecting the seed sowing apparatus to a towing vehicle. Positioned along the rear member 10 of the outer frame 7 spaced at regular intervals are joining members 21 for attaching the packer 5 to the seed sowing apparatus as described below.

The cylindrical drum 2 has an aperture 22 on one side wall for the addition of water. Pouring water into the drum 2 will increase its weight, so that the drum 2 can be used as a land roller. In this case, the increased weight of the cylindrical drum 2 will cause any stones or other obstacles encountered by the seed sowing apparatus to be pushed underground, thereby preventing them from damaging other equipment. Extending axially from the drum 2 are connecting members 23 for mounting the drum 2 into the inner frame 6. There are a plurality of apertures 24 on the connecting members 23 for alignment and inter-connection with the apertures 15 in the side members 13 of the inner frame 6. Because of the plurality of apertures 15 in the side members 13, the connecting members 23 can be connected to the side members 13 at a variety of positions, thereby altering the angle of the drum 2 relative to the frame 1. Additionally, there are a plurality of annular flanges 25 mounted on the drum 2 so as to extend radially outwardly and lying in the radial plane of the drum 2, extending partly around the cylindrical drum 2, for engaging and displacing soil, thereby forming furrows 38. The flanges 25 comprise a ground-engaging member 26 and a bolt member 27. The bolt member 27 of one flange 25 is inserted into one of a plurality of apertures 28 lying in the radial plane of the drum 2 such that the ground-engaging member 26 extends radially outward from the exterior of the drum 2. A nut 29 is screwed onto each bolt member 27 from the interior of the drum 2 and tightened to secure the flange 25 to the drum 2. The drum 2 must be mounted in the frame 1 at other than right angles in order for the furrows 38 to form properly. By adjusting the angle at which the drum 2 is mounted into the frame, the width of the furrow 38 can be varied. Ideally, the angle is variable from 3° to 7°. Obviously, spacing between rows and furrows can be altered by modifying the number of flanges and/or altering their relative positions. Additionally, the depth of the furrows 38 can be varied by varying the height of the flanges 25.

The scraper 3 comprises a largely horizontal member that is connected to the inner frame 6 at the lower face of the tail member 12 by a plurality of springs 30. As fields are often uneven, the scraper 3 is spring-loaded so as to minimize damage caused from encountering rocks or other obstacles during the seeding process. The height of the scraper 3 is variable so that seed depth can also be varied, as described below.

The details of the seed tubes 4 are not shown as these will be well-known to one skilled in the art. The seed tubes 4 are attached to the bar 14 of the inner frame 6 at positions that are behind the drum 2 such that each seed tube 4 is aligned with a flange 25. As a consequence, the seed tubes 4 are flexible enough so that their exact positioning is also flexible. Thus, when the seed sowing apparatus is in operation, the seeds 31 in the seed tubes 4 will be dropped directly into the furrows 38 formed by the flanges 25. Furthermore, the seed tubes 4 are connected to a hose from the seed receptacle 32.

The packer 5 comprises a heavy tube 33 that is connected to the joining members 21 spaced along the rear member 10 of the outer frame 7 as follows. Declined members 34 are attached at one end to the outer frame 7 via the joining members 21 such that the declined members 34 extend downward in an angular direction. The other end of the declined members 34 is then bolted to an axle 35 around which the heavy tube 33 rotates. Around the exterior of the heavy tube 33 at evenly-spaced intervals and extending around the entire tube are "V"-shaped rings 36 that are slightly flattened at the apex of the "V". The spacing between the adjacent "V"-shaped rings 36 is approximately the same as the spacing between adjacent flanges 25. However, in operation, the "V"-shaped rings 36 are positioned so as to pass between adjacent furrows 38, which means that the "V"-shaped rings 36 will compress the soil surrounding the seeds 31.

The seed sowing apparatus is assembled as follows. The drum 2 is mounted into the inner frame 6 by aligning the apertures 15 in the side members 13 of the inner frame 6 and the apertures 24 in the connecting means 23 of the drum such that the drum 2 is at the desired angle relative to the frame 1 and then locking the drum 2 into place by inserting a bolt 37 through the aligned apertures. As stated above, varying the angle will alter the width of the furrow 38 formed by the flanges 25. Next, the cylindrical shafts 16 are inserted into the "U"-shaped slots 17 in the front end 9 and the rear end 10 of the outer frame 7. Because of the means used to connect the inner frame ID to the outer frame 7, the drum 2 and the inner frame 6 are able to twist and bounce relative to the outer frame 7. As stated above, the seed tubes 4 are connected to the bar 14 of the inner frame 6. Prior to operation, each of the seed tubes 4 are connected to a hose from the seed receptacle 30, thereby ensuring a supply of seeds throughout the seeding process. Furthermore, the flexibility of the seed tubes 4 allows them to be manipulated such that they are precisely aligned with the flanges 25. This will ensure that the seeds 31 are deposited directly into the furrows 38. As stated above, the scraper 3 is connected to the tail member 12 of the inner frame 6 by a plurality of springs 30. The fact that the scraper 3 is spring-loaded allows it to respond to changes in the topography of the field being sown. Finally, the axle 35 of the heavy tube 33 of the packer 5 is bolted to one end of the declined member 34. The other end of the declined member 34 is bolted to the joining member 21 positioned along the rear member 10 of the outer frame 7, thereby connecting the packer 5 to the seed sowing apparatus. Of note is that the spacing between the "V"-shaped rings 36 of the packer 5 is identical to the spacing between the flanges 25 of the drum 2, but the "V"-shaped rings 36 are positioned so as to pass between the furrows 38 formed by the flanges 25. The end result is that the soil enclosing the seeds 31 will be compressed by the "V"-shaped rings 36. To summarize, the frame has an intended direction of working motion. As such, the assembled seed sowing apparatus comprises, from front to back, a flanged drum 2, seed tubes 4, a scraper 3 and a packer 5.

In operation, the hitch members 20 of the frame 1 are connected to a towing vehicle. As the seed sowing apparatus is pulled across the ground in the direction of working movement, the drum 2 rolls on the ground. During this process, the flanges 25 engage the ground and then release, forming furrows 38. Because of the fluid nature of the connection between the inner frame 6 and the outer frame 7, the drum 2 remains in contact with the ground at all times, meaning that the furrows 38 are all of uniform depth, since the depth of the furrow 38 formed is directly proportional to the height of the flange 25. As the seed sowing apparatus continues to move in the direction of working motion, the seed tubes 4 move into position above the furrows. At this point, seeds 31 will travel down the hose from the seed receptacle 32 to the seed tubes 40 and then into the furrows 38. Throughout this process, the spring-loaded scraper 3 is in contact with the ground. As the seed sowing apparatus continues to move forward, the scraper 3 directs the soil displaced by the flanges 25 during furrow formation back into the furrows 38. In this manner, the seeds 31 will be enclosed within the soil. By varying the height of the scraper 3, the amount of soil directed into the furrows 38 can be altered. This in turn will effect the seed depth. As stated above, the packer 5 is connected to the frame 1 at a position that is behind the seed tubes 4 relative to the direction of working motion of the seed sowing apparatus. Thus, progressive movement of the seed sowing apparatus causes the packer 5 to roll over the seeds 31 enclosed within the soil. As stated above, the packer 5 comprises a plurality of "V"-shaped rings 36 that are evenly-spaced around the exterior of the heavy tube 33. As the heavy tube 33 rolls along the ground, the "V"-shaped rings 36 will cause the soil between the "V"-shaped rings 36 to become compressed. Since the "V"-shaped rings 36 are positioned so as to pass between the furrows 38 formed by the flanges 25, the soil enclosing the seeds 31 will be compressed. This in turn will promote synchronous germination of the crop.

Since various modifications can be made in my invention as herein above described, and many apparently widely different embodiment of same made within the spirit and scope of the claims without departing from such spirit and scope, it is intended that all matter contained in the accompanying specification shall be interpreted as illustrative only and not in a limiting sense.

We claim:

1. A seed sowing apparatus comprising:

a frame arranged for transportation across the ground, said frame having an intended direction of working movement;

a cylindrical drum having a peripheral wall for rolling on the ground;

means for mounting the cylindrical drum in the frame for rotation about a longitudinal axis of the drum;

at least one annular flange mounted on the drum so as to extend radially outwardly and lying in a radial plane of the drum, extending partly around the cylindrical drum, said flange for engaging and displacing soil, thereby forming furrows; and a plurality of seed tubes connected to the frame at positions that are behind the cylindrical drum relative to the intended direction of working movement of the frame, said seed tubes for depositing seeds into the furrows, wherein the frame holds the cylindrical drum so that the axis of the cylindrical drum is not at right angles relative to the intended direction of working movement of the frame.

2. The seed sowing apparatus according to claim 1 including means for directing the soil into the furrows, thereby enclosing the seeds within the soil.

3. The seed sowing apparatus according to claim 2 wherein the means for directing the soil into the furrows comprises a horizontal scraper.

4. The seed sowing apparatus according to claim 3 wherein the horizontal scraper is connected to the frame at a position that is behind the seed tubes relative to the intended direction of working movement of the frame.

5. The seed sowing apparatus according to claim 4 wherein the horizontal scraper is spring-loaded.

6. The seed sowing apparatus according to claim 5 including a packer for compressing the soil enclosing the seeds.

7. The seed sowing apparatus according to claim 6 wherein the packer is attached to the frame at a position that is behind the horizontal scraper relative to the intended direction of working movement of the frame.

8. The seed sowing apparatus according to claim 7 wherein the cylindrical drum is hollow.

9. The seed sowing apparatus according to claim 8 including an aperture in the cylindrical drum for addition of water.

10. The seed sowing apparatus according to claim 9 wherein the flanges are bolted to the cylindrical drum.

11. The seed sowing apparatus according to claim 10 wherein the angle of the axis of the cylindrical drum relative to the intended direction of working movement of the frame is adjustable.

* * * * *